United States Patent [19]

von Ballmoos et al.

[11] Patent Number: 4,874,504
[45] Date of Patent: Oct. 17, 1989

[54] PH CONTROL BY BULKY ORGANIC BASES DURING NOBLE-METAL EXCHANGE OF ZEOLITE CATALYSTS

[75] Inventors: Roland von Ballmoos, Hopewell; Francis X. Ryan, Lambertville, both of N.J.

[73] Assignee: Mobil Oil Corporation, New York, N.Y.

[21] Appl. No.: 325,636

[22] Filed: Mar. 20, 1989

Related U.S. Application Data

[62] Division of Ser. No. 139,211, Dec. 29, 1987, Pat. No. 4,814,306.

[51] Int. Cl.$^4$ .................... C10G 11/05; C10G 35/095; C07C 2/12; C07C 5/22
[52] U.S. Cl. .................... 208/111; 208/120; 208/138; 208/143; 585/277; 585/417; 585/418; 585/444; 585/467; 585/475; 585/481; 585/482; 585/533; 585/629; 585/640; 585/666
[58] Field of Search ............. 208/111, 120, 138, 143; 585/277, 417, 418, 444, 467, 475, 481, 482, 533, 629, 640, 666

[56] References Cited

U.S. PATENT DOCUMENTS

| | | | |
|---|---|---|---|
| 4,180,282 | 2/1980 | Tabak et al. | 208/134 |
| 4,209,384 | 6/1980 | Hilfman | 208/111 |
| 4,556,646 | 12/1985 | Bezman | 502/66 |
| 4,615,997 | 10/1986 | Chen et al. | 502/66 |
| 4,683,214 | 7/1987 | Angevine et al. | 502/66 |
| 4,699,894 | 10/1987 | Santilli et al. | 502/74 |
| 4,735,929 | 4/1988 | Bakas et al. | 502/66 |
| 4,814,306 | 3/1989 | von Ballmoos et al. | 502/62 |

*Primary Examiner*—Asok Pal
*Attorney, Agent, or Firm*—Alexander J. McKillop; Charles J. Speciale; Robert B. Furr, Jr.

[57] ABSTRACT

A method is disclosed which provides improved control over the noble-metal exchange of zeolite catalyst by using bulky organic bases to control pH during the metal loading step.

26 Claims, No Drawings

PH CONTROL BY BULKY ORGANIC BASES DURING NOBLE-METAL EXCHANGE OF ZEOLITE CATALYSTS

This is a divisional of copending application Ser. No. 139,211, filed on Dec. 29, 1987, now U.S. Pat. No. 4,814,306.

BACKGROUND OF THE INVENTION

This invention relates to a method of preparing a noble metal-containing catalyst. More particularly, this invention relates to the addition of noble metals to a zeolite catalyst.

Shape selective catalysis utilizing molecular sieves was first demonstrated by P. B. Weisz and V. J. Frilette in *J. Phys. Chem.* 64, p. 302 (1960). Since then, the shape selective catalytic properties of various zeolites have been extensively demonstrated. For example, N. Y. Chen and W. E. Garwood in "Some Catalytic Properties of ZSM-5, a New Shape Selective Zeolite", *Journal of Catalysis*, 52, pp. 453–458 (1978) described the shape selectivity of ZSM-5.

The effect of the addition of noble metals on the properties of zeolite catalysts has been of substantial interest in the literature. P. B. Weisz, V. J. Frilette, R. W. Maatman and F. B. Mower in "Catalysis by Crystalline Aluminosilicates II. Molecular-Shape Reactions", *Journal of Catalysis*, 1, pp. 307–312 (1962) described a shape selective olefin hydrogenation catalyst comprising platinum incorporated in zeolite A. In U.S. Pat. No. 3,140,322 to V. J. Frilette and P. B. Weisz, a process is disclosed for hydrogenation using a platinum containing zeolite. In U.S. Pat. No. 3,226,339 of V. J. Frilette and R. W. Maatman, a process is described for the preparation of a platinum- or palladium-containing zeolite catalyst. U.S. Pat. No. 3,575,045 of J. N. Miale discloses the use of a platinum entrained zeolite A for selective hydrogenation.

A catalyst and process for selectively hydrogenating ethylene in the presence of propylene utilizing a zeolite in conjunction with a hydrogenation metal is disclosed in U.S. Pat. No. 3,496,246. N. Y. Chen and P. B. Weisz in "Molecular Engineering of Shape-Selective Catalysts", *Kinetics and Catalysis, Chem. Eng. Prog. Symp.* Serial No. 73, Vol. 63, 1967, p. 86, described a platinum catalyzed hydrogenation employing a phosphine-poisoned, platinum-exchanged sodium mordenite zeolite.

An excellent summary of the art of metal loaded zeolite catalysts and shape selective catalysis is given in *Zeolite Chemistry and Catalysts*, J. A. Rabo, ed., ACS Monograph 171 (1976). Of particular interest is Chapter 10, "Catalytic Properties of Metal-Containing Zeolites" by K. M. Minachev and Y. I. Isakov and Chapter 12, "Shape-Selective Catalysis" by S. M. Csicsery.

Catalysts such as ZSM-5 combined with a Group VIII metal are described in U.S. Pat. No. 3,856,872 to Morrison. It is disclosed in this patent that the catalysts be preferably incorporated in a porous matrix such as alumina. A Group VIII (hydrogenation) metal may then be added after incorporation with the zeolite in a matrix by such means as base exchange or impregnation. In one embodiment, the metal is added in the form of chloroplatinic acid.

U.S. Pat. No. 4,188,282 discloses particularly preferred forms of noble metal-containing zeolites such as ZSM-5 formed by the crystallization of the zeolite from a forming solution containing noble metal ions, such as those of platinum.

U.S. Pat. No. 4,209,384 teaches the preparation of a hydroprocessing catalyst comprising an alumina-mordenite carrier material and a platinum component. The catalyst is prepared by incorporating the platinum component with a solution having a pH greater than about 6.

There are also methods known in the prior art to decrease the amount of noble metal required to achieve a particular desired catalytic effect by increasing the degree of dispersion. For example, U.S. Pat. No. 4,568,656 teaches loading and uniformly distributing platinum onto a zeolite-L. The zeolite-L is contacted with an aqueous solution containing a platinum salt in a non-platinum metal salt, wherein the non-platinum metal salt is present in solution in an amount which is critical to preventing the formation of acid sites as well as avoiding an excess of metal ions in the form of a salt which could block the pores of the zeolite-L.

U.S. Pat. No. 4,615,997 teaches a method for preparing hydroisomerization zeolite catalysts containing a highly dispersed noble metal. The method includes mix mulling the zeolite, noble metal and binder into an extrudate and chemically treating the formed particles in order to achieve a high dispersion of noble metal on the catalyst.

U.S. Pat. No. 4,683,214 discloses a process for preparing a noble metal-containing zeolite catalyst of high noble metal dispersion. The process comprises crystallizing a zeolite from a forming mixture which contains an organic template, treating the zeolite by calcining or chemical oxidation to remove the template from the zeolite, mulling the zeolite with an inorganic oxide binder and a noble metal-containing solution and thereafter extruding the blended mixture.

Platinum-containing zeolite catalysts have become important bifunctional catalysts for processes such as catalytic dewaxing and reforming. Platinum may be incorporated into the zeolite matrix by impregnation or by ion exchange. Ion exchange is generally preferred, as it is believed to yield a more shape-selective catalyst.

SUMMARY OF THE INVENTION

In accordance with the present invention, there is provided a process for the noble-metal loading of crystalline zeolite catalysts using bulky organic bases to adjust the pH during the metal loading step. The preparation technique comprises mixing a zeolite catalyst with an aqueous solution of a noble metal salt, adjusting the pH of the aqueous solution to between about 4 and about 11 by adding a bulky organic base, maintaining the pH of the aqueous solution between about 4 and about 11 by the continuous addition of the bulky organic base, filtering the suspension to separate the solid zeolite catalyst, and drying the solid zeolite catalyst.

The present process provides complete control over the noble-metal exchange step in the preparation of noble-metal loaded zeolite catalysts. Materials of lesser acid strength than conventional aluminosilicate zeolites, such as Ga-zeolites, In-zeolites, silicoaluminophosphates, aluminophosphates, and silca polymorphs to name a few, which pose problems during nobel-metal exchange reactions due to their reduced affinity for noble metal cations can now be easily loaded with noble metals.

Further, by carefully adjusting the pH of the noble-metal exchange solution with a bulky organic base while it is slurried with the zeolite catalyst, selective exchange may be achieved, e.g. strong acid sites only, or all sites including weak silanols.

The subject invention also relates to a process for the conversion of a hydrocarbon feedstock by contacting said hydrocarbon feedstock under conversion conditions with the novel noble metal-containing catalysts produced by the disclosed preparation technique.

DETAILED DESCRIPTION

Materials of lesser acid strength than conventional aluminosilicate zeolites, for example Ga-zeolites, In-zeolites, silicoaluminophosphates, aluminophosphates and silica polymorphs may pose problems during noble-metal exchange reactions due to their reduced affinity for the metal cations. The present invention allows these materials to be easily loaded with noble metals. Catalysts produced by the method of the present invention are particularly useful in any process or combination of processes which employ noble metal catalyst components, for example platinum or palladium. Examples of such processes include hydrogenation, dehydrogenation, dehydrocyclization, isomerization, hydrocracking, dewaxing, reforming, conversion of alkyl aromatics, and oxidation.

Noble metals which are incorporated within the zeolite by the present invention may include ruthenium, rhodium, palladium, silver, osmium, iridium, platinum, and gold. In addition, any suitable hydrogenation component, e.g. a Group VIII metal, may be incorporated within a zeolite by the present invention. Platinum is a particularly preferred metal for the purposes of the present invention. Suitable platinum compounds useful in the subject exchange process include various cationic platinum compounds such as platinous chloride and various compounds containing platinum amine or tetraamine complexes.

The nobel-metal containing ion exchange solution must be maintained at a pH of from about 4 to about 11 to promote noble metal cation exchange. The optimum pH level depends on the acid strength of the zeolite exchange sites. For example, a zeolite having strongly acidic exchange sites such as ZSM-5, zeolite Y, or mordenite would achieve its maximum noble metal cation exchange in a pH range of about 4 to about 7. A zeolite having moderately acidic exchange sites such as [Ga]-ZSM-5, [Fe]-ZSM-5, [In]-ZSM-5 or any of the substituted aluminophosphates would require an ion-exchange solution pH in the range of about 7 to about 9. Finally, a zeolite having very weakly acidic exchange sites such as a high silica ZSM-5 would require an ion-exchange solution pH in the range of about 9 to about 11.

The degree of the noble metal cation exchange may be controlled by carefully adjusting the pH of the exchange solution while it is slurried with the zeolite catalyst. To exchange only the strongly acidic exchange sites in a zeolite, the exchange solution should be maintained at a pH of about 4 to about 7. Increasing the pH of the solution would promote noble metal cation exchange at progressively more weakly acidic exchange sites until substantially all the exchange sites including the weak silanols are exchanged at a pH of around about 11.

In the most preferred embodiment of the present improved method of noble metal cation exchange, an aqueous solution of a noble metal salt is continuously added to an aqueous suspension of a zeolite while the pH of the resulting mixture is maintained by the continuous addition of a bulky organic base. The noble metal salt solution and bulky organic base may also be combined with the zeolite suspension in a stepwise manner.

During the metal loading step in the preparation of noble metal exchanged zeolites, pH is controlled to promote the cation exchange reaction. This exchange is impeded, however, by the presence of $Na^+$ or $NH_4^+$ cations which appear to compete with the noble metal cations for exchange sites inside the pores of the zeolite. Unlike the bases NaOH and $NH_4OH$, which are commonly used to control pH, the bulky organic bases useful in the present invention are too large to diffuse into the pores of the zeolite catalyst. Thus competition for exchange sites inside the catalyst pores appears to be eliminated by controlling the pH with an organic base having a minimum cross-sectional dimension larger than the pore openings of the zeolite to be exchanged. For example, to eliminate the competition for exchange sites during the metal loading of a ZSM-5 zeolite, a base having a minimum cross-sectional dimension equal to at least the minimum cross-sectional dimension of tetraethylammonium hydroxide must be used.

Noble metal salts useful in the present invention include all of the water soluble noble metal salts, for example, platinum tetraaminechloride, platinum chloride, and chloroplatinic acid. The concentration of the aqueous noble metal salt solution is not critical but preferably should not exceed saturation in the range of temperatures employed for the exchange reaction.

The preferred temperature range of the subject noble metal exchange process is between about 10° C. and the reflux temperature of the aqueous zeolite suspension.

It is preferred to combine noble metal salt solution with the aqueous zeolite slurry at a rate such that the noble metal addition to the exchange solution does not exceed the rate of noble metal loss from the solution by exchange with the zeolite.

The members of the class of zeolites useful herein have an effective pore size of generally from about 4 to about 12 Angstroms. In addition, the structure must provide constrained access to larger molecules. It is sometimes possible to judge from a known crystal structure whether such constrained access exists. For example, if the only pore windows in a crystal are formed by 8-membered rings of silicon and aluminum atoms, then access by molecules of larger cross-section than normal hexane is excluded.

Twelve-membered rings generally exclude molecules having a cross-sectional dimension larger than 8 Angstroms.

A convenient measure of the extent to which a zeolite provides control to molecules of varying sizes to its internal structure is the Constraint Index of the zeolite. Zeolites which provide a highly restricted access to and egress from its internal structure have a high value for the Constraint Index, and zeolites of this kind usually have pores of small size, e.g. less than 5 Angstroms. On the other hand, zeolites which provide relatively free access to the internal zeolite structure have a low value for the Constraint Index, and usually pores of large size, e.g. greater than 7 Angstroms. The method by which Constraint Index is determined is described fully in U.S. Pat. No. 4,016,218, incorporated herein by reference for details of the method.

Constraint Index (CI) values for some typical materials are:

| | CI (at test temperature) |
|---|---|
| ZSM-4 | 0.5 (316° C.) |
| ZSM-5 | 6–8.3 (371° C.–316° C.) |
| ZSM-11 | 5–8.7 (371° C.–316° C.) |
| ZSM-12 | 2.3 (316° C.) |
| ZSM-20 | 0.5 (371° C.) |
| ZSM-22 | 7.3 (427° C.) |
| ZSM-23 | 9.1 (427° C.) |
| ZSM-34 | 50 (371° C.) |
| ZSM-35 | 4.5 (454° C.) |
| ZSM-48 | 3.5 (538° C.) |
| ZSM-50 | 2.1 (427° C.) |
| TMA Offretite | 3.7 (316° C.) |
| TEA Mordenite | 0.4 (316° C.) |
| Clinoptilolite | 3.4 (510° C.) |
| Mordenite | 0.5 (316° C.) |
| REY | 0.4 (316° C.) |
| Amorphous Silica-alumina | 0.6 (538° C.) |
| Dealuminized Y | 0.5 (510° C.) |
| Erionite | 38 (316° C.) |
| Zeolite Beta | 0.6–2.0 (316° C.–399° C.) |

The above-described Constraint Index is an important and even critical definition of those zeolites which are useful in the instant invention. The very nature of this parameter and the recited technique by which it is determined, however, admit of the possibility that a given zeolite can be tested under somewhat different conditions and thereby exhibit different Constraint Indices. Constraint Index seems to vary somewhat with severity of operations (conversion) and the presence or absence of binders. Likewise, other variables, such as crystal size of the zeolite, the presence of occluded contaminants, etc., may affect the Constraint Index. Therefore, it will be appreciated that it may be possible to so select test conditions, e.g. temperature, as to establish more than one value for the Constraint Index of a particular zeolite. This explains the range of Constraint Indices for some zeolites, such as ZSM-5, ZSM-11 and Beta.

It is to be realized that the above CI values typically characterize the specified zeolites, but that such are the cumulative result of several variables useful in the determination and calculation thereof. Thus, for a given zeolite exhibiting a CI value within the range of 1 to 12, depending on the temperature employed during the the test method within the range of 290° C. to about 538° C., with accompanying conversion between 10% and 60%, the CI may vary within the indicated range of 1 to 12. Likewise, other variables such as the crystal size of the zeolite, the presence of possibly occluded contaminants and binders intimately combined with the zeolite may affect the CI. It will accordingly be understood to those skilled in the art that the CI, as utilized herein, while affording a highly useful means for characterizing the zeolites of interest is approximate, taking into consideration the manner of its determination, with the possiblity, in some instances, of compounding variable extremes. However, in all instances, at a temperature within the above-specified range of 290° C. to about 538° C., the CI will have a value for any given zeolite of interest herein within the approximate range of 0.1 to 50.

EXAMPLE 1

Example 1 illustrates noble metal exchange of a weakly acidic zeolite without pH control. A sample of an indium-containing ZSM-5 synthesized in the absence of Na was calcined at 538° C. and then exchanged with Pt in a solution of 15 mg $Pt(NH_3)_4Cl_2$ per gram of zeolite. The product was filtered and dried and the platinum content determined by titration of the evolved amine (Temperature Programmed Ammonia Desorption) and by chemical analysis. Only 0.03 wt.% Pt were detected in the zeolite. The pH of the exchange solution was below 5. This example indicates that weakly acidic zeolites have a very low affinity for noble metal cations.

EXAMPLE 2

Example 2 shows the effect of pH control using ammonium chloride. A sample of an indium-containing ZSM-5 synthesized in the absence of Na was calcined at 540° C. and then exchanged with 1M $NH_4Cl$. This ammonium form of the material was slurried into a solution containing 15 mg $Pt(NH_3)_4Cl_2$ per gram of zeolite. The pH was kept at 7.6 by an automatic titrator with 0.1N $NH_4OH$. The platinum loading was 0.15 wt.%. Thus raising the pH above neutral resulted in a higher level of noble-metal loading.

EXAMPLE 3

Example 3 demonstrates the exchange of Pt into the calcined H-form of an indium-containing ZSM-5 in the presence of a bulky organic base. A solution of 15 mg $Pt(NH_3)_4Cl_2$ per gram of zeolite was prepared by dissolving 225 mg of the salt in 10 g of water. 15 g of the H-zeolite were suspended in 280 g of water. The pH of the suspension was 4.5. The pH of this suspension was adjusted to 8.0 with 0.015N TBAOH (tetrabutylammoniumhydroxide) prior to the addition of the Pt solution. The pH was maintained between 7.5 and 8.0 during the addition of the Pt. The sample was filtered and dried overnight at 90° C. Temperature Programmed Ammonia Desorption of the product in $H_2$ yielded 0.0466 meq/g ash between 200°–400° C. This is equivalent to 0.9 wt.% Pt. The product was heated in oxygen to 350° C. in preparation for the catalytic tests.

EXAMPLE 4

Example 4 shows a noble metal exchange in the presence of a bulky organic base following a noble metal exchange in the presence of ammonium chloride. The additional platinum exchange in the absence of ammonium cations demonstrates the competition between ammonium and platinum cations for exchange sites. The product of Example 2 was calcined in air to 540° C. 1 g was slurried in 20 ml of water, and the pH adjusted to 8.0 with TBAOH. A solution of 15 mg $Pt(NH_3)_4Cl_2$ gram of zeolite was added to the suspension over 2.5 hours with a syringe pump. The pH of the slurry was maintained at 7.6 with 0.1N TBAOH dispensed by an automatic titrator. The product sample was filtered and dried at 90° C. The TPAD analysis in $H_2$ showed an additional uptake of 0.602 wt.% Pt by the catalyst after this reexchange.

EXAMPLE 5

Example 5 demonstrates noble metal exchange for a high-silica zeolite without pH control. The process described in Example 1 was repeated for a super-high silica ZSM-5 sample having a silica:alumina ratio greater than 1000. The pH of the exchange solution was below 5 and the final metal loading of the exchanged material was 0.03 wt.% Pt.

EXAMPLE 6

High silica zeolites without ion-exchange capacity cannot be loaded with noble metals under standard exchange conditions such as in Example 1, supra. A salt occlusion technique is commonly used due to the fact that the surface and defect silanols are not acidic enough to be deprotonated at pH values below neutral. Example 6 demonstrates the versatility of the novel use of bulky organic bases to increase the pH of exchange solutions by loading a super high-silica ZSM-5 zeolite with platinum. In this example, the silica to alumina ratio of the zeolite was greater than about 1000. 3 g of a calcined super high-silica ZSM-5 material were slurried in 100 g of water. The pH was adjusted to 10.0 by TBAOH (tetrabutylammoniumhydroxide). 45 mg Pt(NH$_3$)$_4$Cl$_2$ were dissolved in 10 g of water. This solution was added to the slurry over 2.5 hours by syringe pump. The suspension was maintained at pH 10.0 with dilute (0.1N) TBAOH, rinsed and air dried. TPAD analysis in H$_2$ of this sample indicated it contained 0.436 wt.% Pt.

EXAMPLE 7

The procedure of Example 3 was repeated for a calcined aliquot of an aluminum-containing ZSM-5 sample. The pH was maintained at 7.5 by an automatic titrator. The final metal loading of the product was 1.1 wt.% Pt.

EXAMPLE 8

The process of Example 6 was repeated for a silicoaluminophosphate material, SAPO-5, the preparation of which is taught by U.S. Pat. No. 4,440,871 to Lok, incorporated by reference as if set forth at length herein. The pH of the exchange solution was maintained at 7.5 by the addition of TBAOH (tetrabutylammoniumhydroxide). The final metal loading was found to be 0.64 wt.% Pt.

EXAMPLE 9

The process of Example 6 was repeated for an aluminophosphate material, AlPO$_4$-5, the preparation of which is taught by U.S. Pat. No. 4,310,440 to Wilson, incorporated by reference as if set forth at length herein. The pH of the exchange solution was maintained at 7.5 by the addition of 0.1N TBAOH (tetrabutylammoniumhydroxide). The final metal loading of the product was found to be 0.9 wt.% Pt.

EXAMPLE 10

An aliquot of the product of Example 3 was tested for n-heptane conversion. Results of the test carried out at 538° C. in a dilute n-heptane stream in nitrogen showed a toluene selectivity of 95 to 96% with very low C$_1$ to C$_6$ yields.

EXAMPLE 11

Another fraction of the product of Example 3 was tested for n-hexane conversion in a dilute stream in nitrogen at 538° C. Results of this extended "alpha" test showed values of 884 to 432 after 1 hour. The benzene selectivity was 33 to 27% during the same period. N-hexane conversion was kept at 25.2 to 13.4%.

What is claimed is:

1. A process for the conversion of hydrocarbons comprising the steps of contacting said hydrocarbons with a composite catalyst under conversion conditions which catalyst comprises a noble metal-containing zeolite prepared by a method comprising:
   (a) mixing a zeolite with water to form an aqueous suspension;
   (b) adjusting the pH of the aqueous suspension of step (a) to between about 4 and about 11 with an organic base of a size sufficient to prevent entry of the organic cations into the pores of the zeolite catalyst;
   (c) adding to the suspension of step (b) an aqueous noble-metal salt solution;
   (d) maintaining the pH of the mixture of step (c) at a uniform value between about 4 and about 11 by the controlled addition of the organic base of step (b), above;
   (e) filtering the zeolite-water suspension of step (c) to separate the solid zeolite material; and
   (f) drying the solid zeolite material.

2. The process of claim 1 wherein said zeolite has a Constraint Index of about 1 and about 12 and said organic base is selected from the group consisting of tetraethylammonium hydroxide, tetrapropylammoniumhydroxide, and tetrabutylammoniumhydroxide.

3. The process of claim 1 wherein said noble metal salt is selected from the group consisting of the platinum tetraaminehalides.

4. The process of claim 1 wherein said noble metal salt is selected from the group consisting of the platinum halides.

5. The process of claim 1 wherein said noble metal salt is selected from the group consisting of platinum tetraaminechloride, platinum chloride and chloroplatinic acid.

6. The process of claim 1 wherein said organic base is continuously added.

7. The process of claim 1 carried out between about 10° C. and the reflux temperature of the aqueous zeolite suspension.

8. The process of claim 7 wherein said zeolites have a Constraint Index ranging from about 0.1 to about 50.

9. The process of claim 8 wherein said zeolites are selected from the group consisting of zeolite Beta, ZSM-5, ZSM-11, ZSM-12, ZSM-18, ZSM-20, ZSM-22, ZSM-23, ZSM-35 and ZSM-48.

10. The process of claim 7 wherein said zeolites are selected from the group consisting of silicoaluminophosphates, aluminophosphates, substituted aluminophosphates and silica polymorphs.

11. The process of claim 7 wherein said zeolite comprises an indium-substituted zeolite having the structure of ZSM-5, and said noble metal salt comprises platinum tetraaminechloride.

12. The process of claim 7 wherein said zeolite comprises a gallium-substituted zeolite having the structure of ZSM-5, and said noble metal salt comprises platinum tetraaminechloride.

13. The process of claim 7 wherein said zeolite comprises a zeolite having the structure of ZSM-5 and a silica:alumina ratio greater than about 20 and said noble metal salt comprises platinum tetraaminechloride.

14. The process of claim 7 wherein said zeolite comprises a zeolite having the structure of ZSM-5 and a silica:alumina ratio greater than about 1000 and said noble metal salt comprises platinum tetraaminechloride.

15. A process for the conversion of hydrocarbons comprising the steps of contacting said hydrocarbons with a composite catalyst under conversion conditions which catalyst comprises a noble metal-containing zeolite prepared by a method comprising:
  (a) mixing a zeolite having a Constraint Index of between about 1 and about 12 with water to form an aqueous suspension;
  (b) adjusting the pH of the aqueous suspension of step (a) to between about 4 and about 11 with an organic base of a size sufficient to prevent entry of the organic cations into the pores of the zeolite catalyst;
  (c) adding to the suspension of step (b) an aqueous noble-metal salt solution;
  (d) maintaining the pH of the mixture of step (c) at a uniform value between about 4 and about 11 by the controlled addition of the organic base of step (b), above;
  (e) filtering the zeolite-water suspension of step (c) to separate the solid zeolite material; and
  (f) drying the solid zeolite material.

16. The process of claim 15 wherein said noble metal salt is selected from the group consisting of the platinum tetraaminehalides.

17. The process of claim 15 wherein said noble metal salt is selected from the group consisting of the platinum halides.

18. The process of claim 15 wherein said noble metal salt is selected from the group consisting of platinum tetraaminechloride, platinum chloride and chloroplatinic acid.

19. The process of claim 15 wherein said organic base is continuously added.

20. The process of claim 15 carried out between about 10° C. and the reflux temperature of the aqueous zeolite suspension.

21. The process of claim 20 wherein said zeolites are selected from the group consisting of zeolite Beta, ZSM-5, ZSM-11, ZSM-12, ZSM-18, ZSM-20, ZSM-22, ZSM-23, and ZSM-48.

22. The process of claim 20 wherein said zeolites are selected from the group consisting of silicoaluminophosphates, aluminophosphates, substituted aluminophosphates and silica polymorphs.

23. The process of claim 20 wherein said zeolite comprises an indium-substituted zeolite having the structure of ZSM-5 and said noble metal salt comprises platinum tetraaminechloride.

24. The process of claim 20 wherein said zeolite comprises a gallium-substituted zeolite having the structure of ZSM-5 and said noble metal salt comprises platinum tetraaminechloride.

25. The process of claim 20 wherein said zeolite comprises a zeolite having the structure of ZSM-5 with a silica:alumina ratio greater than about 20 and said noble metal salt comprises platinum tetraaminechloride.

26. The process of claim 20 wherein said zeolite comprises a zeolite having the structure of ZSM-5 with a silica:alumina ratio greater than about 1000 and said noble metal salt comprises platinum tetraaminechloride.

* * * * *